(12) United States Patent
De Rozarieux et al.

(10) Patent No.: US 11,650,181 B2
(45) Date of Patent: May 16, 2023

(54) MONITORING APPARATUS FOR GUTTERING SYSTEM

(71) Applicant: H D Sharman Ltd, High Peak Derbyshire (GB)

(72) Inventors: Mark De Rozarieux, High Peak Derbyshire (GB); Jakob Moeller-Jensen, High Peak Derbyshire (GB)

(73) Assignee: HD SHARMAN LTD, High Peak (GB)

( * ) Notice: Subject to any disclaimer, the term of this patent is extended or adjusted under 35 U.S.C. 154(b) by 657 days.

(21) Appl. No.: 16/498,565

(22) PCT Filed: Mar. 29, 2018

(86) PCT No.: PCT/GB2018/050865
§ 371 (c)(1),
(2) Date: Sep. 27, 2019

(87) PCT Pub. No.: WO2018/178708
PCT Pub. Date: Oct. 4, 2018

(65) Prior Publication Data
US 2020/0048910 A1 Feb. 13, 2020

(30) Foreign Application Priority Data
Mar. 31, 2017 (GB) ...................................... 1705184

(51) Int. Cl.
*G01N 29/032* (2006.01)
*E04D 13/076* (2006.01)
*E04D 13/064* (2006.01)

(52) U.S. Cl.
CPC ......... *G01N 29/032* (2013.01); *E04D 13/076* (2013.01); *E04D 13/064* (2013.01);
(Continued)

(58) Field of Classification Search
CPC ......... G01N 29/032; G01N 2991/0228; G01N 2291/02416; G01N 2291/02836; E04D 13/076; E04D 13/064
(Continued)

(56) References Cited

U.S. PATENT DOCUMENTS 4,221,004 A * 9/1980 Combs ................ G01F 23/2962
367/908
2022/0172177 A1* 6/2022 De Rozarieux ........ G06Q 10/20

FOREIGN PATENT DOCUMENTS

CH         619789 A5 * 10/1980
CN       210664619 U *  6/2020
(Continued)

*Primary Examiner* — Lisa M Caputo
*Assistant Examiner* — Rose M Miller
(74) *Attorney, Agent, or Firm* — GableGotwals

(57) ABSTRACT

An apparatus which includes a mounting, a plurality of detectors provided to detect a condition of at least on parameter indicative of presence of one or more materials in a gutter channel and data processing capabilities. A sequence of signals are transmitted and received when the apparatus is in a detection mode, and the data processing analyses the received signals to provide an indication if a material is detected as being present in the channel and, if detected, a type of the material. On the basis of this analysis and identification of material, decision can be made as to whether any remedial action is required to clear the material and/or decide upon an ongoing monitoring and maintenance.

22 Claims, 7 Drawing Sheets

Figure 1A:
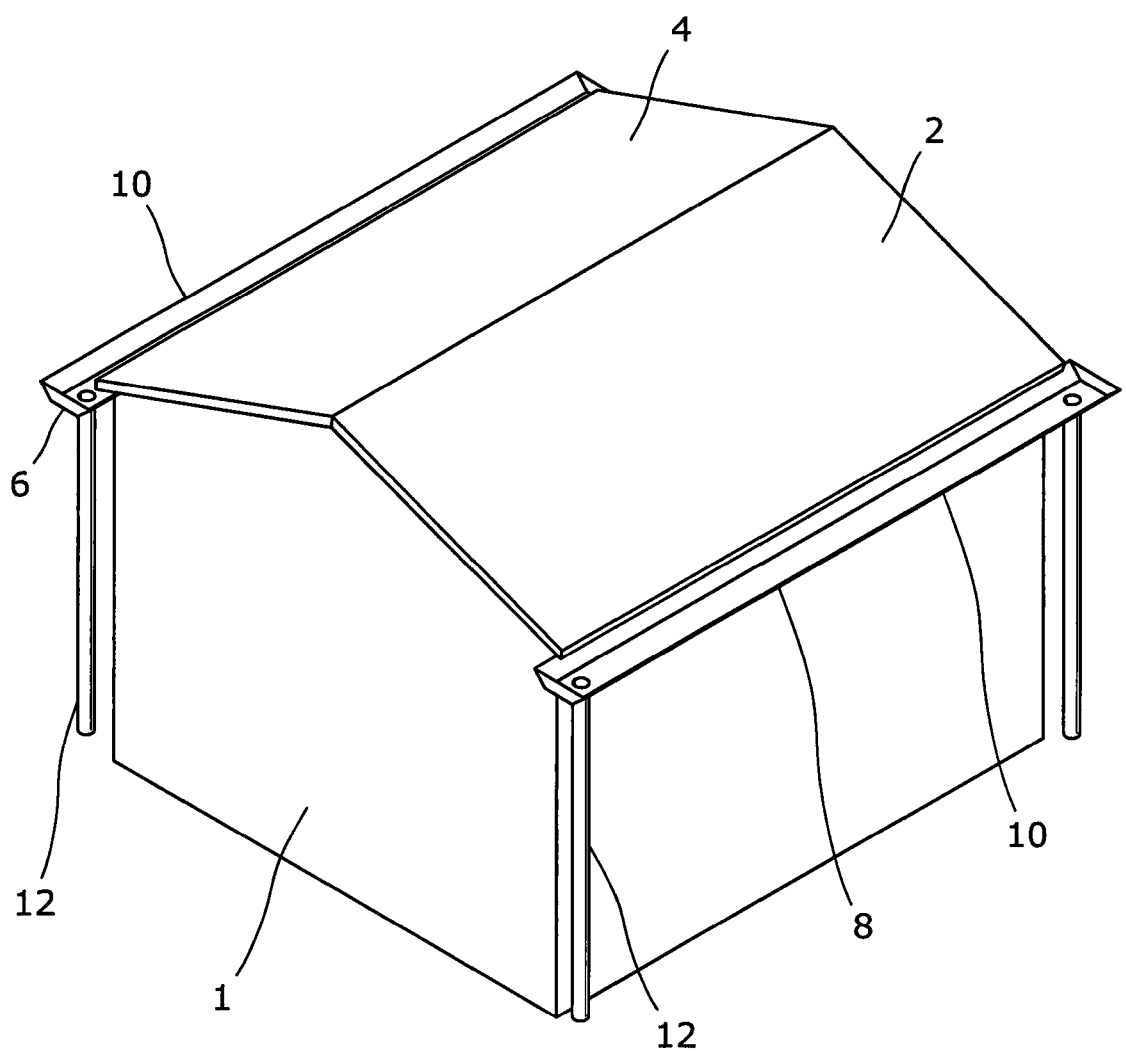

(52) U.S. Cl.
CPC ................ *G01N 2291/0228* (2013.01); *G01N 2291/02416* (2013.01); *G01N 2291/02836* (2013.01)

(58) Field of Classification Search
USPC .......................................................... 73/599
See application file for complete search history.

(56) References Cited

FOREIGN PATENT DOCUMENTS

| | | | | | |
|---|---|---|---|---|---|
| CN | 214667051 | U | * | 11/2021 | |
| CN | 216483324 | U | * | 5/2022 | |
| DE | 102004049170 | A1 | | 4/2006 | |
| EP | 2776069 | A1 | | 9/2014 | |
| EP | 4009012 | A1 | * | 6/2022 | ........... G01F 23/296 |
| GB | 2527208 | A | | 12/2015 | |
| WO | WO-2020028941 | A1 | * | 2/2020 | ............. E04D 13/00 |

* cited by examiner

MONITORING APPARATUS FOR GUTTERING SYSTEM

CROSS-REFERENCE TO RELATED APPLICATIONS

This United States application is the National Phase of PCT Application No. PCT/GB2018/050865 filed 29 Mar. 2018, which claims priority to British Patent Application No. 1705184.8 filed 31 Mar. 2017, each of which is incorporated herein by reference.

The invention to which this application relates is apparatus and a method for use in the monitoring of the condition of drainage gutters and particularly, although not necessarily exclusively, for guttering systems which are provided to be used to collect liquid from roofs of a building or buildings. The apparatus allows, on the basis of the data received from the monitoring, an analysis to be performed and, if required, maintenance of the gutters to be undertaken.

A problem with guttering in most, if not all, types of buildings, but in particular, warehouses, large sheds, retail buildings and the like, is that the guttering channels, once installed, are difficult to access and/or, if accessed, it is expensive and time consuming to do so. This can therefore mean that, in many instances, the guttering is not maintained at all or, if it is maintained, is maintained infrequently. More commonly, any defects or problems with the guttering are not identified until there is a potentially catastrophic failure and typically one which causes flooding of the premises, damage to the building infrastructure and/or the surrounding environment. This, in turn, means that the expense which is caused by the fault in terms of repairing the same and also potential insurance claims for damage caused by the resultant flooding from the fault, is significant. However, because of the lack of conventional monitoring apparatus and accessibility, this problem has, until now, been tolerated.

It should also be appreciated that while different forms of guttering may have different maintenance requirements and different lifespans, that the problem may exist with any form of guttering and therefore the apparatus as described herein, can be utilised with any form of guttering for roofs of buildings.

Faults in guttering can typically be caused by one or a number of different occurrences. One occurrence may be that the material from which the gutter is formed, deteriorates over time due to exposure to sunlight, rain and the like. Another possibility is that the guttering may be damaged, due to wind, or contact with another structure and a yet further possibility is that debris gathers in the channel of the guttering and therefore starts to block up the guttering and reduce the flow of water which is possible along the same. While it is known to provide apparatus to clear guttering, the use of the same is infrequent or, if scheduled, the schedule is not based on any depth of knowledge relating to the actual condition of the guttering on which the apparatus is to be used. It is also known to provide apparatus which can detect if there is a build-up of water lying in the gutter and which causes an alert to be generated if the level reaches a height which causes part of the apparatus to be submerged in the water and, if so, it is believed that there is a risk that this will cause a flood, or damage to the fabric of the building, but this form of apparatus allows only a reactive response as it only provides a "yes/no" detection facility.

The aim of the present invention is therefore to provide a system whereby the condition of guttering can be monitored over time and, as a result of the monitoring, a schedule of maintenance can be developed and/or, if the monitoring apparatus determines that there is a particular problem, an alert can be generated which causes immediate action to be taken to rectify the same and therefore prevent a catastrophic failure of the guttering.

In a first aspect of the invention, there is provided apparatus for monitoring the condition of a portion of guttering, said apparatus including a mounting, a plurality of detection means provided to detect the condition of at least one parameter indicative of the presence of one or more materials in the gutter channel and data processing means, wherein a sequence of signals are transmitted and received when the apparatus is in a detection mode and the data processing means analyse the received signals to provide an indication if a material is detected as being present in the channel and, if detected, a type of the material.

In one embodiment at least one condition of the signals transmitted in the sequence of signals is altered.

In one embodiment the strength and/or direction of the data signals which are transmitted is the condition which is altered in the sequence of signals.

Typically the detection means are mounted so as to provide data indicative of the material in the gutter channel in a contactless manner with respect to the material.

Typically the data signals are ultrasonic signals.

In one embodiment the apparatus includes a weatherproof housing in which the detection means are located.

Typically the data processing means includes bespoke software to process the outputs from the receivers of the signals and, in one embodiment images from one or more cameras of the gutter channel.

In one embodiment the apparatus includes solar power panels and the photovoltaic element converts sunlight to act as the recharging mechanism for power cells provided in situ with the housing.

In one embodiment the said detection means include multiple ultrasonic transmitters and receivers, and in one embodiment the detection means are provided as a series of transceivers to allow the sending or receiving of signals in the form of ultrasonic frequency waves. Typically the ultrasonic signals are emitted in the range of 20-40 kHz.

In one embodiment the data processing means allows the analysis of the received signals and, by combining detection means and signals, a differentiation in signal frequency & gain (the amplitude of signal) is identified and allocated to different bands, such as High, Medium and Low, or a combination of two, or all three. As a result of this analysis the data processing means can identify if a material is present in the gutter channel and, if so, identify from the received signals whether the material which is present in the gutter channel at that time is a dry, damp and/or wet material.

In one embodiment the data processing means can perform further analysis including the provision of truth values and fuzzy logic analysis. The deployment of fuzzy logic can be used as a stabilising feature between possibly true and possibly false readings and so more accurate measurements on all materials encountered can be achieved.

In one embodiment the detection means emit and receive several signal readings per second in the sequence to allow the data processing means to then perform the analysis of the form of the received signals.

In one embodiment the apparatus includes at least one camera to take video images of the said gutter channel and the analysis of the signals and identification of the material type can be checked or validated with reference to the images received from the one or more cameras. In one embodiment a plurality of cameras are provided on the housing at the left and right-hand side of the gutter to allow the capturing of images of the gutter. In one embodiment the cameras allow a greater length of the gutter channel to be assessed than the portion of the gutter channel for which the ultrasonic signals are received.

In one embodiment the housing includes a wireless communication system and/or geographical location identification system such as a GSM/GPRS communication module, providing geographical coverage for all communications between the monitoring location and the data processing means, which may be located remotely from the housing.

In a further embodiment, a communication module is provided to permit the issuing of alerts, in one embodiment issued from the housing to the data processing means via appropriate I.P addresses and converted into email, text and/or a combination of both to end users.

In one embodiment each received signal is collated and stored for a predetermined time frame, and issued to memory means for future back up purposes, providing memory for reference by the data processing means, and future condition assessment and risk management of the gutter to the end user.

In one embodiment the software output from the data processing means provides a visual representation of the signals received and processed. This acts as the connection between the apparatus which is roof mounted at the gutter channel and the end user, such as the owner of the building with which the guttering is provided and/or the building maintenance contractor and/or guttering manufacturer.

In one embodiment the results of the data processing and video is displayed via the software and allocated to the respective roof drainage channel/gutter that is being monitoring.

In one embodiment the detection means includes two signal transmitters on each side of the channel directed to transmit signals into the channel.

In one embodiment the same number of receivers (which may be the same as the transmitters) are provided to receive the signals which are reflected from the channel.

In many cases multiple monitoring apparatus are provided and can be provided in combination to act as a gutter monitor system using common data processing means.

In one embodiment the data processing means can generate an indication of the level of risk of gutter malfunction, video images, live weather indication, battery capacity, geographical location of the monitor, gutter maintenance scheduling, roof access information and/or can be further tailored to meet specific user requirements.

Thus there is provided the ability to provide real time monitoring of gutter performance and the ability to schedule future maintenance based on the real time monitoring.

In one embodiment, a precipitation gauge is provided and the apparatus includes a location means, such as a plate, on which the precipitation gauge and/or other detection can be located. In one embodiment, the said plate is adjustable with respect to the remainder of the mounting so as to ensure that the plate is substantially horizontal and therefore allows the apparatus to be adapted for use with different angles of sloping roof.

In one embodiment other detection means can be used in the form of a laser sensor or other non-contact sensor which can operate to detect changes in the water level without having to be in contact with the water in the gutter channel.

In one embodiment, the mounting is provided to allow the apparatus to be mounted on, or adjacent to, any type of roof such that the detection means are located in, or adjacent to, the portion of the guttering channel which is being monitored. In one embodiment, the mounting is provided to allow the apparatus to be adjustably mounted with respect to a ridge or sloping roof.

Typically, the mounting is provided with location means which can be selectively used in order to allow the mounting to be most effectively located on the particular roof type to which the same is to be used.

In one embodiment, the detection means is located on an arm and, at the free end of the arm. Typically the opposing end of the arm the same is located on, or formed as part of, the mounting.

Typically, the arm is articulated so as to allow the free end of the arm to be moved between an in use condition and a retracted positon which allows the same to be moved away from and/or along the channel so as to allow improved access to be gained to the channel for maintenance and/or cleaning purposes.

In one embodiment any, or any combination, of a precipitation gauge, a temperature detector and/or humidity detector are provided. In one embodiment the data from the rain gauge allows the data processing means to indicate what the expected liquid flow and/or level of liquid is expected to be for the gutter portion at that time and this allows the data processing means to make a comparison of that value or values with the signals received by the ultrasonic detection means which indicates the material present in the gutter channel at that time and, if the material is wet, an indication of the actual level of the liquid in the drainage channel portion at that time. If the actual liquid level matches or is within a predetermined range of the expected value then the guttering is deemed to be operating correctly but if the actual liquid level value is outwith the predetermined range then further action is indicated as being required, either as an emergency or as part of a schedule of maintenance.

In one embodiment, the apparatus is provided with receiving and/or communication means which are wireless, or as part of a cable communication system in order to allow data from the detection means, camera and other monitoring apparatus to be sent to a remote location at which the data processing means or further data processing means may be located. Also, the communication means can be used to receive data from the remote location which may be used to calibrate the detection means and/or alter the operation of the same and/or cause repairs to be made and/or cause scheduled maintenance to occur and/or, if particular weather events have, or are predicted to be about to occur, the apparatus may be disabled in order to prevent damage to the apparatus and/or the generation of false readings. Such an event could, for example, be snowfall which would temporarily block the guttering channel.

In a further aspect of the invention there is provided apparatus for monitoring the condition of a portion of guttering, said apparatus including at least one first type of detection means provided to detect at least one parameter relating to the material in the gutter channel and wherein the detection is made in a non-contact manner with respect to the liquid.

In a further aspect of the invention there is provided a method of monitoring the condition of a portion of drainage guttering, said method including the steps of emitting a sequence of ultrasonic signals into the channel of the portion of the gutter, receiving the signals which are reflected from the said channel and/or material in the channel at that time, and passing the same to data processing means, analysing the said received signals and generating an indication of the presence or not of a material in the said channel and, if material is detected, the type of the detected material.

In one embodiment a sequence of signals are transmitted in a predetermined time and in one embodiment the signals which are transmitted in a sequence are varied with respect to at least one parameter.

In one embodiment the signals are varied with respect to strength and direction.

In one embodiment in the analysis of the received signals, reference is made to an expected level of water in the channel at that instant of time. In one embodiment the expected level is generated with respect to environnment data and wherein comparing the expected and actual liquid level values identifies the actual performance of the guttering channel at that time and/or the analysis indicates the presence of material other than water.

Typically if there is discrepancy between the expected and actual performance of the guttering and if the actual performance is outwith a first predefined range indicating an imminent failure, an alert is generated, and/or if the actual performance is beyond a second predefined range, maintenance work is indicated as being required and/or if an undesirable material is indicated as being present, such as grass or other vegetation, mud or another obstacle action can be taken to remove the same.

In one embodiment the parameter of the environment is the precipitation, such as rainfall, which has occurred.

In one embodiment, if deterioration in performance is identified, then the number of instances at which the monitoring of the guttering is performed, is increased.

Typically the condition of the guttering portion which is detected is then used to predict the remainder of the guttering in the drainage system for that building and/or drainage systems for buildings in the vicinity and/or in other geographical areas which have similar characteristics.

In one embodiment video images of said portion of the gutter which is being monitored and/or further parts of the gutter channel are captured and used in the analysis by the data processing means.

In one embodiment the said signals are ultrasonic signals.

Thus, the present invention has the advantages of allowing the detection of the environment conditions and the performance of the guttering at the same location, to be obtained and thereby allowing the correlation between the data for the same and hence the performance of the guttering to be assessed.

Specific embodiments of the invention are now described; wherein

Figure 1C:
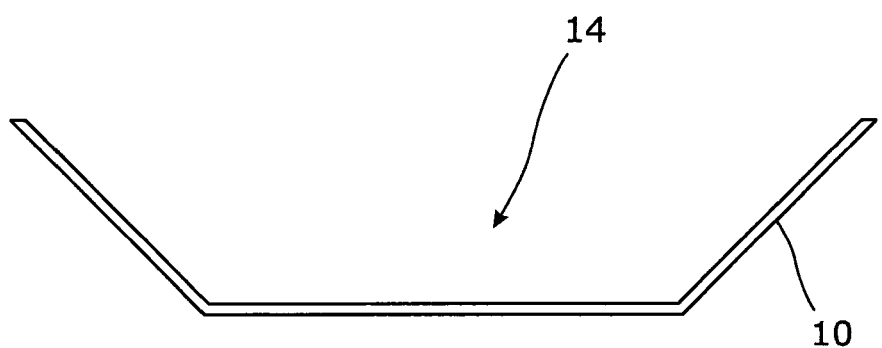
Figure 1B:
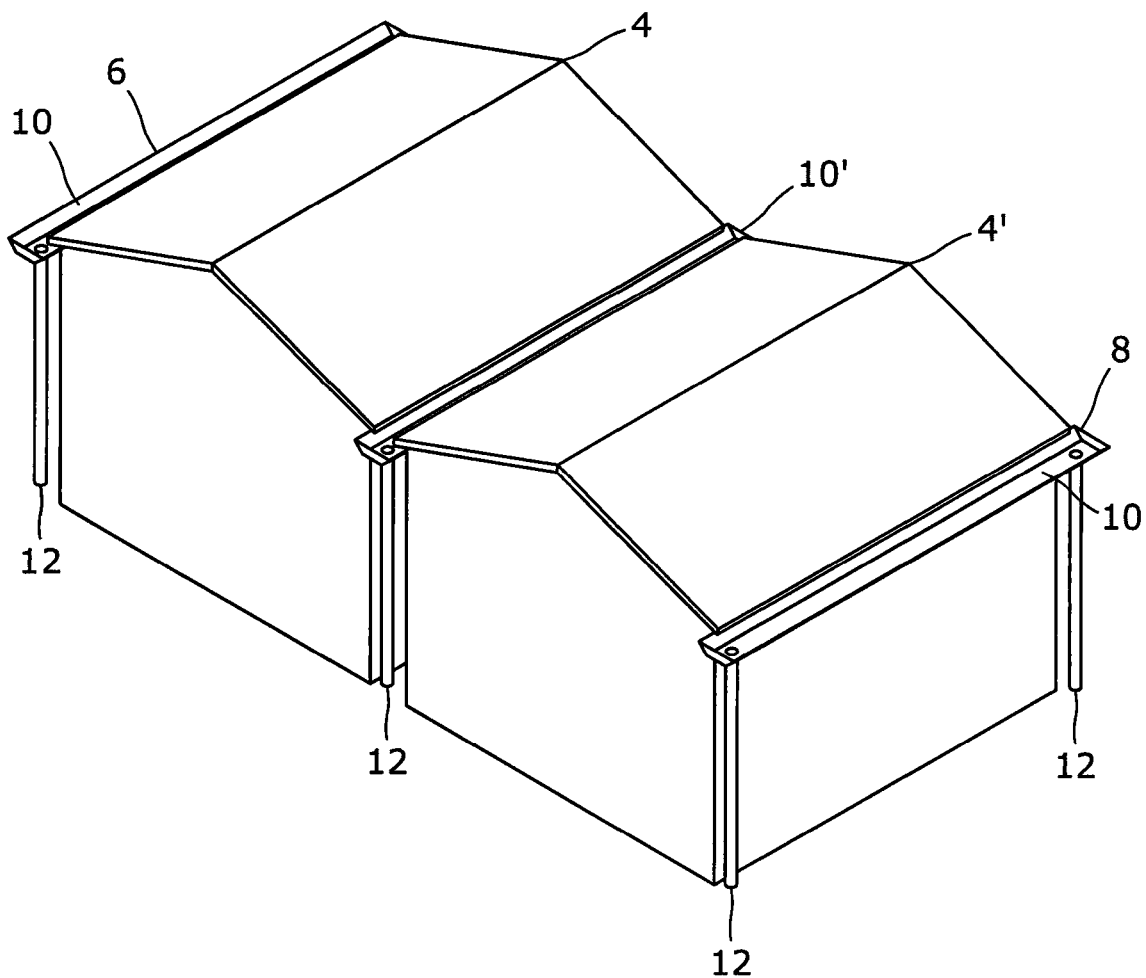

FIG. 1a-c illustrate schematically examples of guttering systems with which the invention can be used.

Figure 2A:
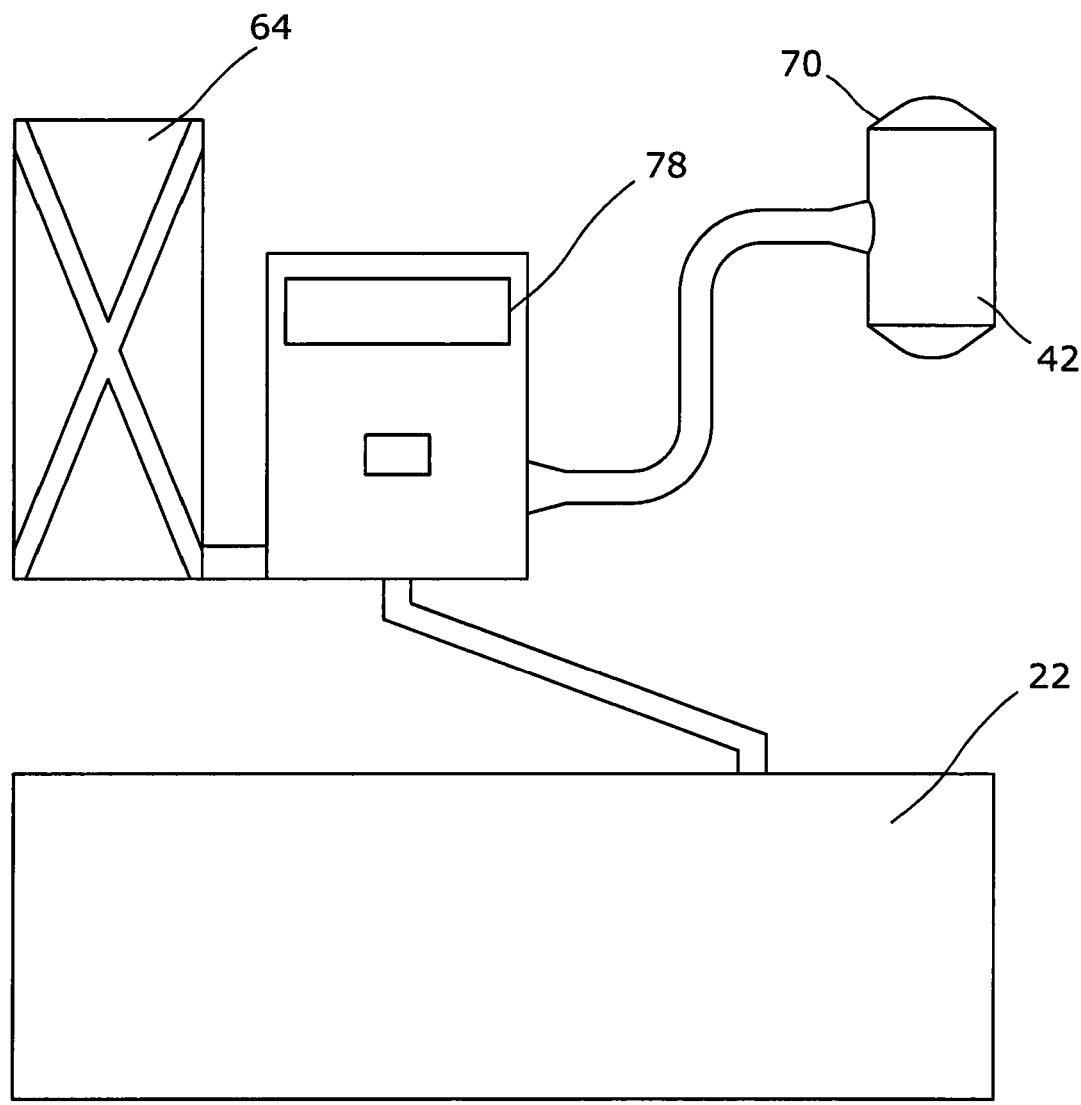
Figure 2B:
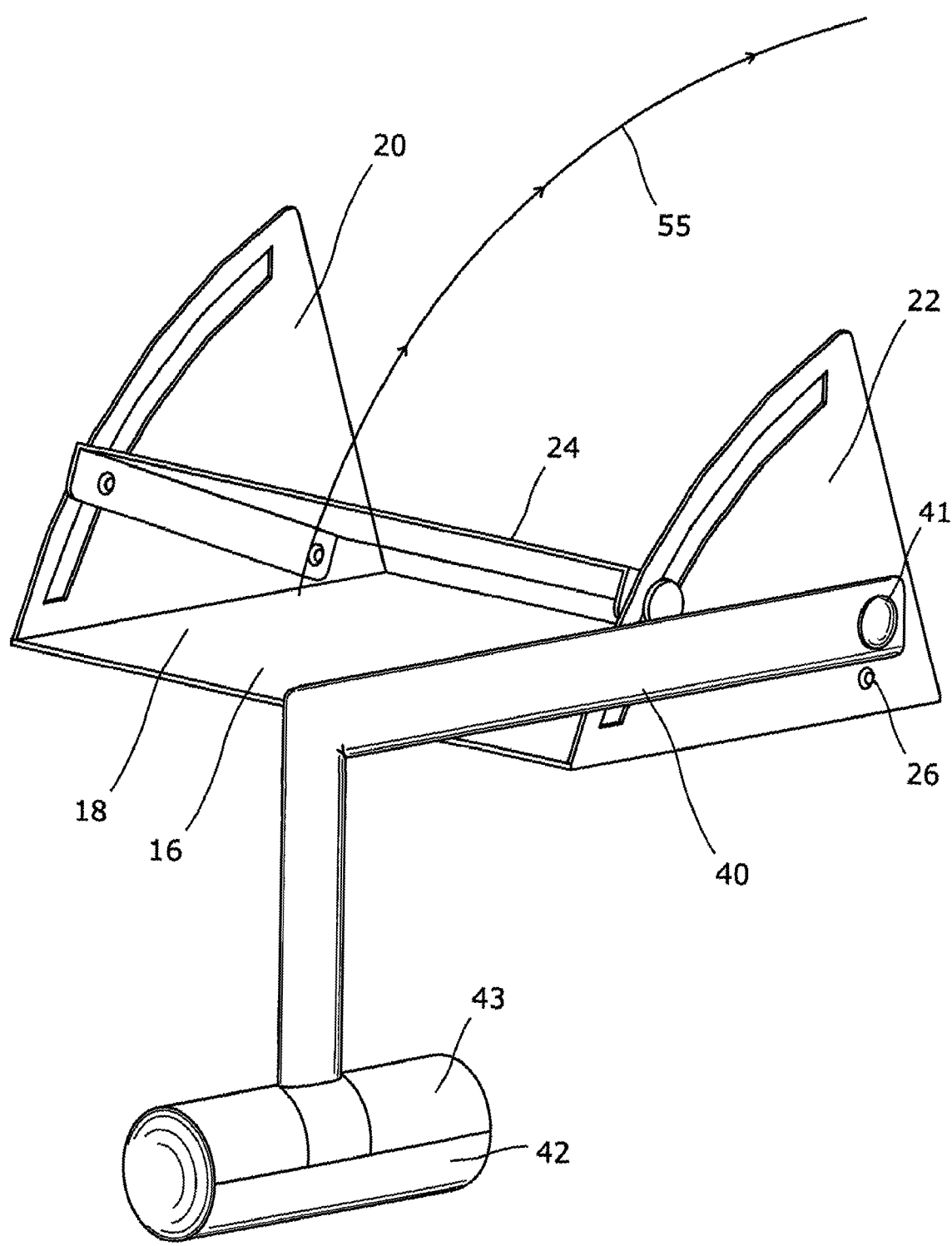
Figure 2C:
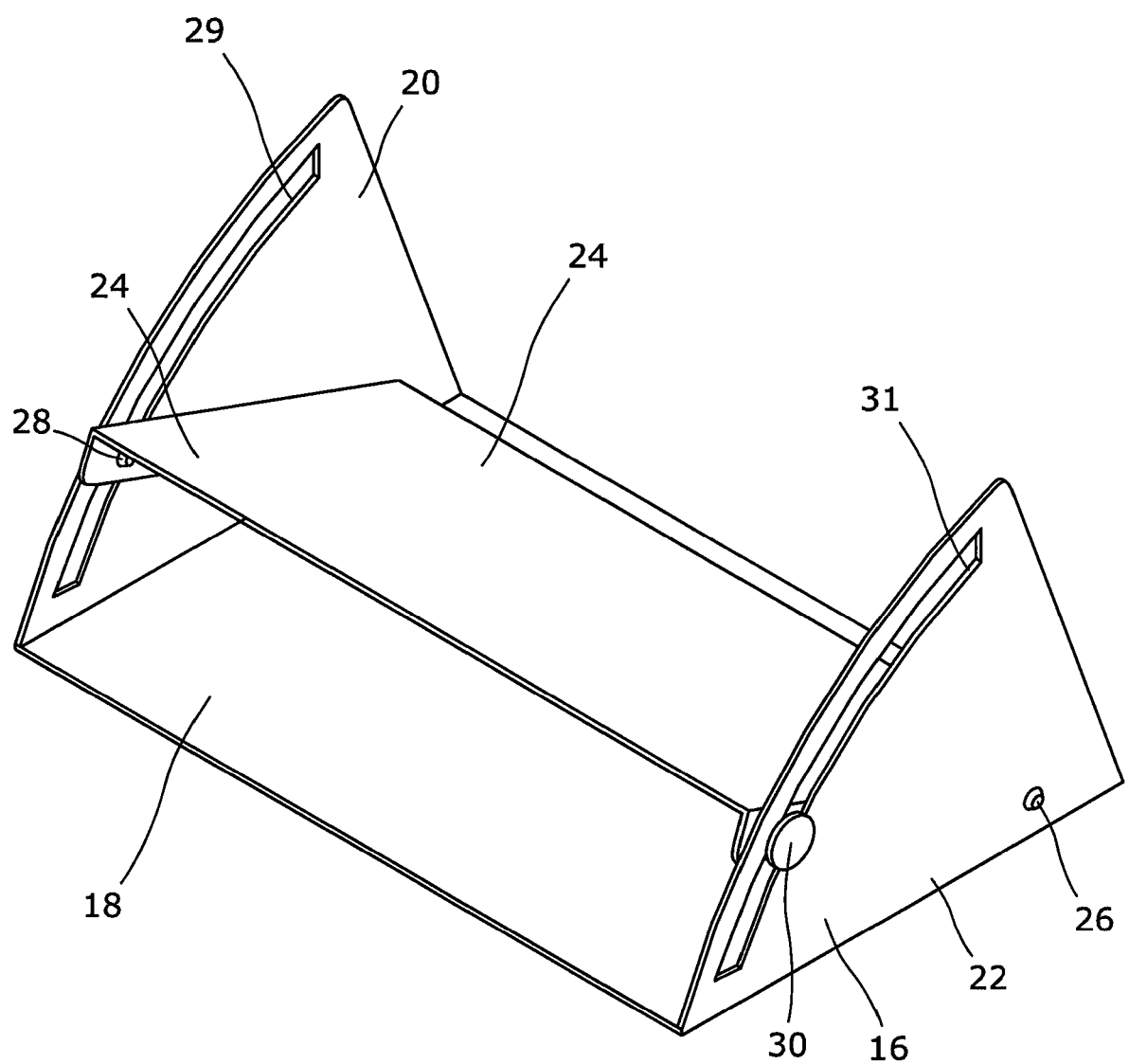
Figure 2G:
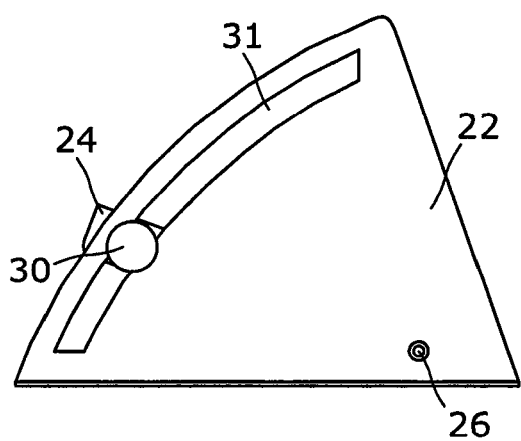
Figure 2F:
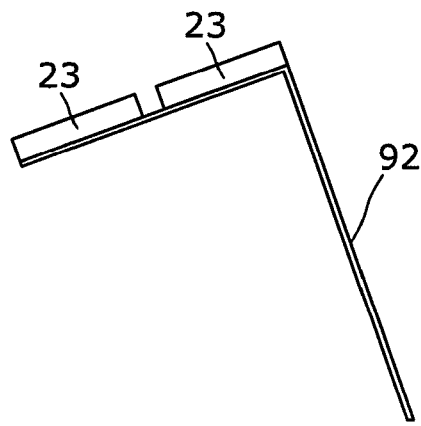
Figure 2E:
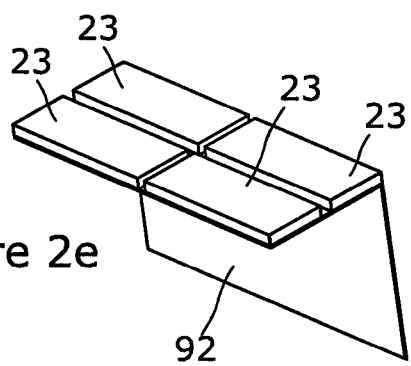
Figure 2D:
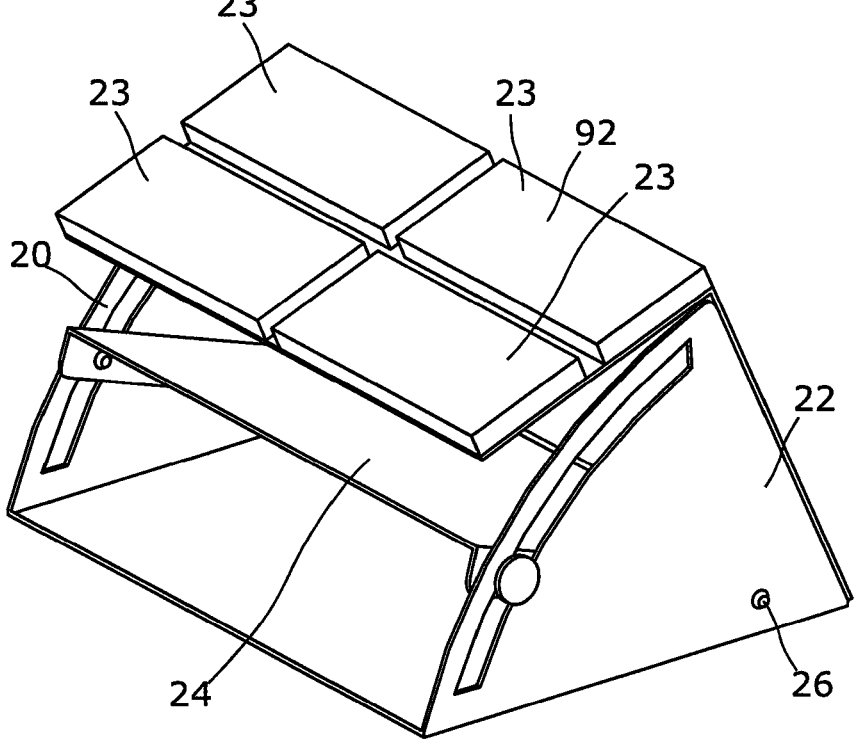
Figure 3:
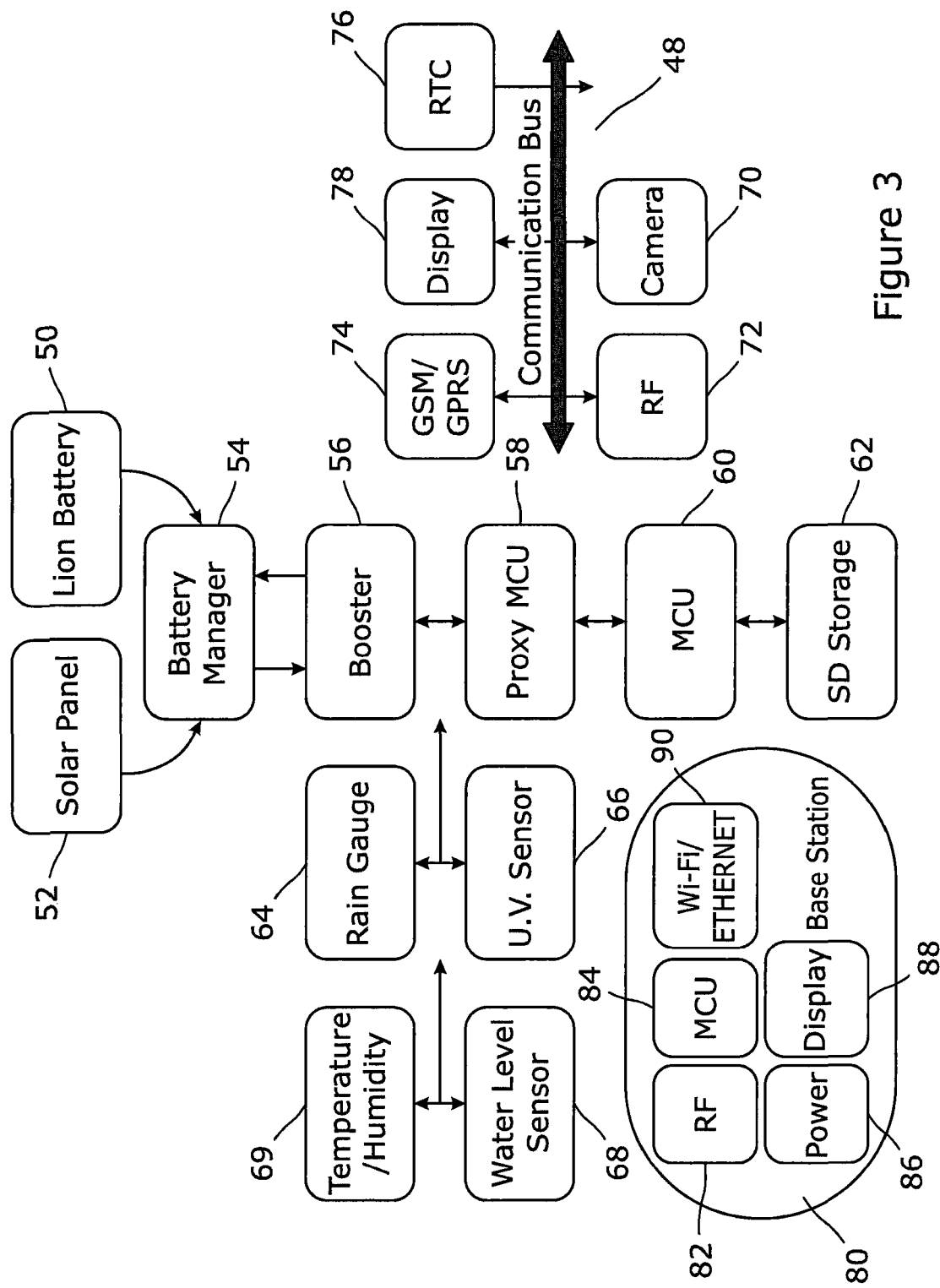

FIGS. 2a-g illustrates views of apparatus in accordance with one embodiment of the invention; and FIG. 3 is a diagram of a data processing system in accordance with one embodiment of the invention.

Figure 4:
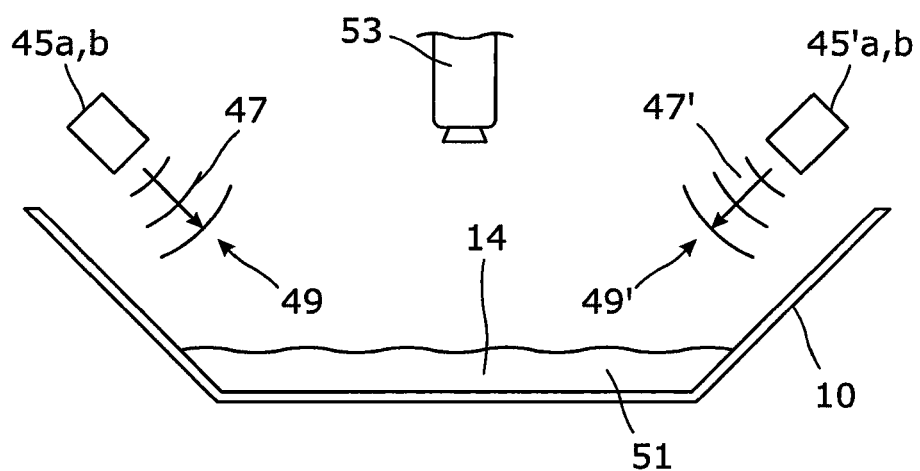

FIG. 4 is a cross sectional view of the gutter portion monitored by the apparatus.

Referring now to FIG. 1a there is illustrated a roof structure 2 of a premises 1 which, in this case, has a ridge 4 and lower edges 6, 8 and which is provided with a drainage system which includes at each of the lower edges gutters 10 with channels 14 which are provided to collect water which drains from the roof ridge 4 downwardly to the lower edges and the gutter channel is provided to allow the flow of water towards one or more downpipes 12 so that the water is then removed from the building.

FIG. 1b illustrates another example of a building which in this case has two ridges 4, 4', outer lower edges 6,8 at which the guttering 10 is provided and a valley gutter 10' which lies at the lowest points between the ridges 4,4'. Again these gutters are connected to downpipes 12. It should be appreciated that the apparatus can be used with any form of roof and with any type of roof covering, such as slate, tile, cladding or the like.

FIG. 1c illustrates a cross section of the gutter 10 and it will be appreciated that the gutter channel 14 can be susceptible to blockage from debris which collects in the same, either from the roof or from deposits from animals or indeed other objects which may be thrown to try and land the same in the channel or vegetation which over time grows in the channel 14. In any case, the debris material can cause blockage and hence deterioration of the flow of water along the channel and, at worst, blockage of the channel so that the water overflows. Furthermore, the guttering may crack or be damaged through impact from another object which again can cause catastrophic failure and flooding and/or the material of the gutter will deteriorate over time.

In accordance with the invention, and as shown, there is illustrated apparatus for monitoring the condition of a portion of the guttering and the apparatus can be located at any suitable location with respect to the guttering. The apparatus includes a mounting 16 which includes a mounting surface 18, arms 20, 22 and a location plate 24 which is pivotally located with the mounting along pivot axis 26. Securing means 28,30 are provided to secure the location plate 24 with the arms 20, 22 so that the same are movable along arcuate channels 29, 31 in the arms so as to allow the mounting plate to be located in a horizontal plane and thereby allow the monitoring apparatus to be mounted on different angles of roof and still have a substantially horizontal location surface.

The apparatus, as shown in FIG. 2b also includes an arm 40 which at one end 41 is located to the mounting and, at its free end 43 there is provided detection means 42 in this case in the form of an array of ultrasonic transmitters and receivers. In one embodiment said array includes two transceivers 45a,b and 45'a,b, positioned to emit signals as indicated by arrows 47, 47' respectively into the gutter channel and to be reflected from material 51 which in this case is water, in the channel 14 at that time to be received by the opposing transceiver 45a,b, 45'a,b as indicated by arrows 49, 49' respectively. A camera 53 may also be provided and these are schematically illustrated in FIG. 4 which is a cross section of the gutter portion which is being monitored. The aim is to determine the level of liquid which is in the channel at that time and/or whether the material detected is a liquid or is another material type without requiring contact with the material by the detecting means. Typically, in order to provide greater accuracy in the date processing of the signals, a sequence of signals are emitted and received as part of a predetermined sequence and during the sequence at least one condition of the signals such as the strength of the signals, is changed, such that different strength signals are emitted during the sequence and the difference in the strength of the received signals can be used as part of the data processing to differentiate between different material types which may be detected as being present in the gutter channel.

In one embodiment the sequence of signals is 6 signals in total, three from the transceivers 45a,b from one side and three from the transceivers 45'a,b from the opposing side of the gutter channel 14, and, during that sequence, the condition of at least one of the emitted signals is changed. Typically the sequence is repeated at predetermined time intervals to provide updated data for the data processing means and thereby provide a continuous monitoring programme to be performed.

The arm 40 is provided to be articulated at least about one pivot axis, in this case axis 41 so as to allow the same to be moved from the in use position shown in FIG. 2b, to a retracted position as shown by arrow 55 in FIG. 2b. When in the retracted position, it is possible for access to be gained more easily to the channel 14 to clean the same as the detection means 42 and free end 43 of the arm are moved away from the channel. It should be appreciated that the movement could be in a horizontal direction as an alternative.

In addition, further measuring means can be provided to provide an indication of real time conditions at the time at which the detection means are being operated. In one embodiment this is a rainfall gauge 64 which is mounted on the mounting plate 18 and this allows a determination of the amount of water which is likely to be present in the gutter channel 14 at a particular time due to the detected rainfall. This therefore allows an analysis to be made as to whether the detected level of rainfall should be causing the detected level of water which is in the drainage channel 14 at that same time, or in a given time range. If the detected water level in the channel matches, or is within a predefined range of the expected water level, then the maintenance of the drainage system is deemed to be adequate, if not, then immediate or scheduled maintenance can be performed. In one embodiment, as shown in FIGS. 2d-g, the apparatus includes a lid arrangement 92 which is positioned at the top of the apparatus and which is located so as to allow the detection means to operate in the required manner to collect environment and gutter channel data whilst, at the same time providing a protective shield to prevent damage to the detection means. The top face of the lid also can act as a location for solar panels 22 to allow power to be provided to the detection means.

The apparatus components are illustrated in one embodiment in FIGS. 2a and 3. The apparatus can include a power source 50 which in one embodiment is charged via a solar panel 23 and a battery management system 54 is provided along with a booster 56. The data processing means can include a Proxy MCU 58, MCU 60, and SD memory storage facility 62. The rain gauge 64, UV Sensor 66, material detection means 68, which can be the transceivers 45a,b, 45'a,b, and temperature and humidity sensor 69 can all be provided as part of the apparatus to allow the condition of the material in the gutter channel and the surrounding environment to be determined. The apparatus also includes a communication bus 48 including the camera 70 and RF 72, GSM/GPRS 74, RTC 76 and display 78 facilities which are provided.

The base station 80 is typically provided at a remote location to have the RF 82, MCU 84, Power supply 86, display 88 and wireless communication services 90 in order to allow communication with the apparatus at its location of use.

Thus, the present invention provides the solution of allowing the detection of the environment conditions and the performance of the guttering at the same location, to be obtained and thereby allowing the correlation between the data for the same, and hence the performance of the guttering to be assessed and then immediate or planned maintenance to be undertaken as required.

The invention claimed is:

1. Apparatus for monitoring a condition of a portion of guttering, said apparatus comprising:
   a mounting,
   a plurality of detection means attached to the mounting provided to detect the condition of at least one parameter indicative of a presence of one or more materials in a gutter channel and data processing means, and
   wherein a sequence of signals are transmitted and received when the apparatus is in a detection mode and the data processing means analyse the received signals to provide an indication if a material is detected as being present in the gutter channel, wherein the analysis and identification of the detected material is validated through images received from one or more cameras mounted as part of the apparatus.

2. Apparatus according to claim 1 wherein transmission and receiving means are mounted so as to provide data signals indicative of the material in the gutter channel in a contactless manner with respect to the material.

3. Apparatus according to claim 1 wherein the signals are ultrasonic signals.

4. Apparatus according to claim 1 wherein the data processing means allows the analysis of the received signals and, by combining multiple detection means and signals, a differentiation in signal frequency and gain (the amplitude of signal) is identified and allocated to different bands, High, Medium and Low, or a combination of two, or all three.

5. Apparatus according to claim 1 wherein the data processing means identifies whether the received signals are related to dry, damp and/or wet materials being present in the gutter channel at that time.

6. Apparatus according to claim 1 wherein signals are transmitted and received several times in a given time period in a sequence.

7. Apparatus according to claim 1 wherein a plurality of cameras are provided in a housing in which other detection means are also located.

8. Apparatus according to claim 1 wherein the plurality of detection means includes at least one signal transmitter located above the gutter channel directed to transmit signals into the gutter channel, and a same number of receivers are provided above the gutter channel to receive signals which are reflected from the gutter channel.

9. Apparatus according to claim 1 wherein the apparatus includes solar power panels and photovoltaic element converts sunlight to act as a recharging mechanism for power cells provided in situ with a housing.

10. Apparatus according to claim 1 including a housing includes a wireless communication system and a geographical location identification system.

11. Apparatus according to claim 10 wherein the communication system permits issuing alerts.

12. Apparatus according to claim 11 wherein the alerts are issued from the housing via appropriate I.P addresses and converted into email, text and or a combination of both to end users.

13. Apparatus according to claim 1 wherein results of the data processing and one or more camera video are allocated by the data processing means to a particular roof drainage gutter channel.

14. Apparatus according to claim 1 wherein multiple monitoring apparatus are provided in combination to act as a gutter monitor system.

15. Apparatus according to claim 1 wherein the mounting is adjustable to allow the apparatus to be mounted on, or adjacent to, different forms of roof such that the sequence of signals can be emitted into and reflected from the gutter channel.

16. Apparatus according to claim 1 wherein at least part of the apparatus is movable between an in use condition and a retracted position which allows the at least part of the apparatus to be moved away from and/or along the gutter channel so as to allow improved access to be gained to the gutter channel for maintenance and/or cleaning purposes.

17. Apparatus according to claim 1 wherein the apparatus is provided with receiving and/or communication means to allow data from the apparatus to be sent to a remote location at which the data processing means or further data processing means may be located, and/or to receive data from the remote location which may be used to calibrate the detection apparatus and/or alter the operation of the same and/or cause repairs to be made and/or cause scheduled maintenance to occur and/or, if particular weather events have, or are predicted to be about to occur, the detection apparatus may be disabled in order to prevent damage to the apparatus and/or the generation of false readings.

18. Apparatus according to claim 1 wherein if a material is detected in the channel, a type of material is identified.

19. Apparatus for monitoring the condition of a portion of guttering, in the form of an open channel said apparatus comprises: at least one first type of detection means provided to detect at least one parameter relating to material in the gutter channel and wherein the detection is made in a non-contact manner with respect to the channel or liquid therein by transmitting ultrasonic signals into the channel from above the channel and receiving reflected ultrasonic signals from the channel using receiving means located above the channel, wherein the monitoring of the gutter channel is validated through the images received from one or more cameras mounted as part of the apparatus.

20. A method of monitoring a condition of a portion of drainage guttering, said method comprising the steps of:

emitting a sequence of ultrasonic signals into a channel of the portion of the drainage guttering, receiving signals which are reflected from the channel and/or material in the channel at that time, passing the signals to data processing means, analysing the received signals, and generating an indication of presence of a material in the channel and, if material is detected, a type of the detected material;

wherein in the analysis of the received signals, reference is made to an expected level of water in the channel at that instant of time, the expected level generated with respect to environmental data and comparing the expected and actual liquid levels, identified the actual performance of the guttering channel at that time and/or the analysis indicates the presence of material other than water.

21. A method according to claim 20 wherein a sequence of signals are transmitted in a predetermined time.

22. A method according to claim 21 wherein if there is discrepancy between the expected and actual performance of a guttering out with a first predefined range indicating an imminent failure, an alert is generated, and/or if the actual performance is beyond a second predefined range, maintenance work is indicated as being required and/or if an undesirable material is indicated as being present, action is instructed to remove the same.

* * * * *